US012627688B2

(12) United States Patent
Licata et al.

(10) Patent No.: US 12,627,688 B2
(45) Date of Patent: May 12, 2026

(54) LOW-CODE PARSER CREATION

(71) Applicant: Google LLC, Mountain View, CA (US)

(72) Inventors: Adam Licata, South Orange, NJ (US); James Paul Black, Sunnyvale, CA (US); Ashish Garg, Bangalore (IN)

(73) Assignee: Google LLC, Mountain View, CA (US)

( * ) Notice: Subject to any disclaimer, the term of this patent is extended or adjusted under 35 U.S.C. 154(b) by 127 days.

(21) Appl. No.: 18/391,926

(22) Filed: Dec. 21, 2023

(65) Prior Publication Data

US 2025/0211601 A1      Jun. 26, 2025

(51) Int. Cl.
*H04L 9/40* (2022.01)
*G06F 8/30* (2018.01)
*G06F 16/25* (2019.01)

(52) U.S. Cl.
CPC ............ *H04L 63/1425* (2013.01); *G06F 8/30* (2013.01); *G06F 16/254* (2019.01); *H04L 63/1416* (2013.01)

(58) Field of Classification Search
CPC ... H04L 63/1425; H04L 63/1416; G06F 8/30; G06F 16/254
See application file for complete search history.

(56) References Cited

U.S. PATENT DOCUMENTS

| | | | | |
|---|---|---|---|---|
| 2010/0162230 | A1* | 6/2010 | Chen ..................... | G06F 9/5072 |
| | | | | 717/177 |
| 2016/0019196 | A1* | 1/2016 | Birdeau ............... | G06F 3/0482 |
| | | | | 715/224 |
| 2020/0334244 | A1* | 10/2020 | Hammerschmidt .... | G06F 16/86 |
| 2020/0409946 | A1* | 12/2020 | Ranghabhatla ....... | G06F 16/254 |
| 2025/0088520 | A1* | 3/2025 | Gerow ............... | H04L 63/1416 |

* cited by examiner

*Primary Examiner* — Abdulkader M Alriyashi
(74) *Attorney, Agent, or Firm* — Lowenstein Sandler LLP

(57) ABSTRACT

A system may include one or more operations, which may include obtaining a first structured event log. The first structured event log may include one or more event log key-value pairs. The operations may further include identifying, among one or more predefined fields, a predefined field for an event log key of a first event log key-value pair of the one or more event log key-value pairs. The operations may include generating a portion of parser code to map the event log key of the first event log key-value pair to the identified predefined field. The operations may further include generating an event log parser that includes the portion of the parser code. The operations may further include causing the event log parser to be executed on a second structured event.

20 Claims, 12 Drawing Sheets

300

310
Obtain a first structured event log comprising multiple event log key-value pairs

320
Identify a predefined field for an event log key of a first event log key-value pair

330
Generate a portion of parser code to map the event log key to the identified predefined field

340
Generate an event log parser that includes the portion of the parser code

350
Cause the event log parser to be executed on a second structured event log

100

200

Computing Resources 130

Server(s) 132

Network Device(s) 134

Data Storage Device(s) 136

Event Log Analytics System 110

Low-code Event Log Parser Generator 116

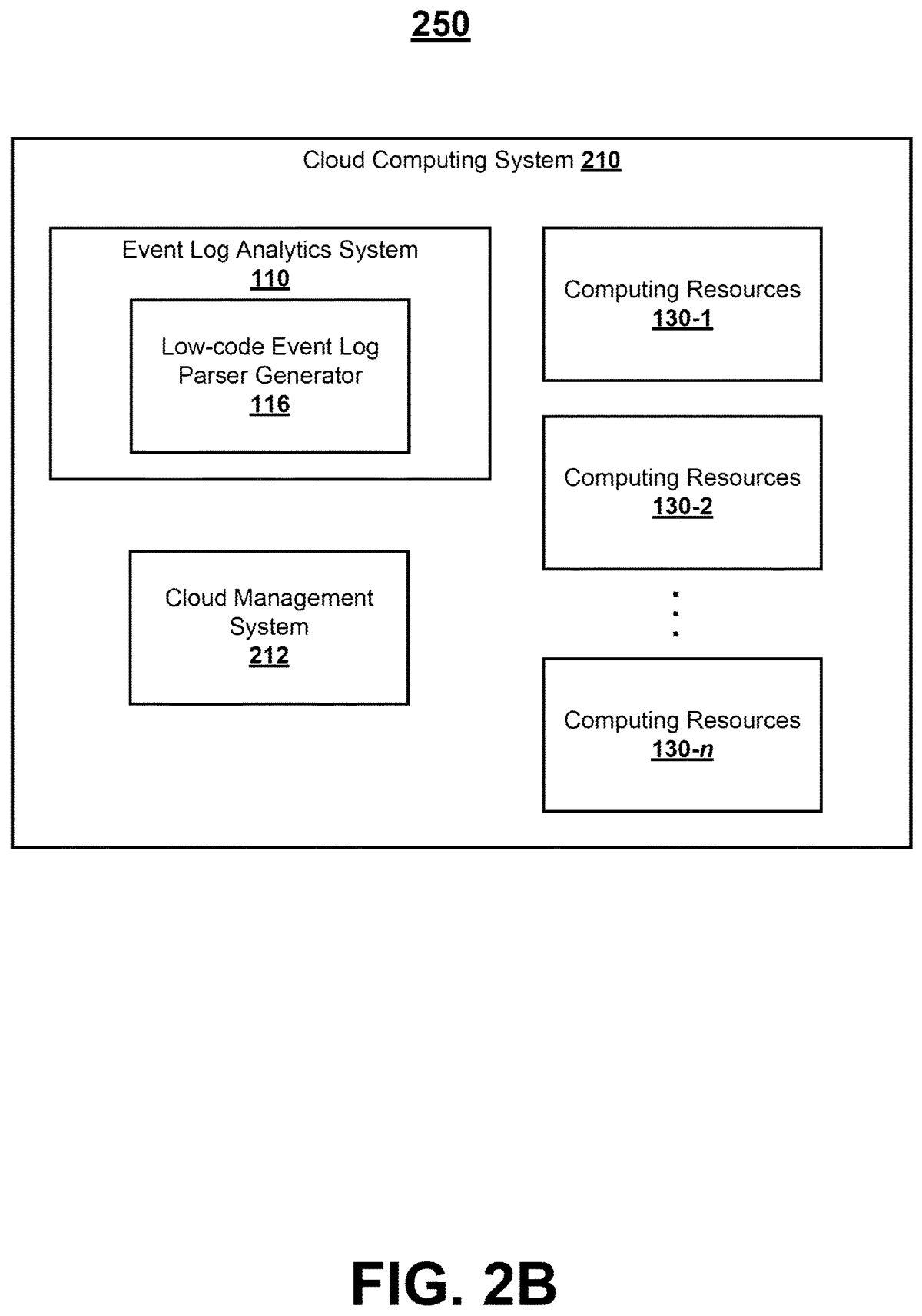

250

Cloud Computing System 210

Event Log Analytics System
110

Low-code Event Log
Parser Generator
116

Cloud Management
System
212

Computing Resources
130-1

Computing Resources
130-2

⋮

Computing Resources
**130-*n***

FIG. 2B

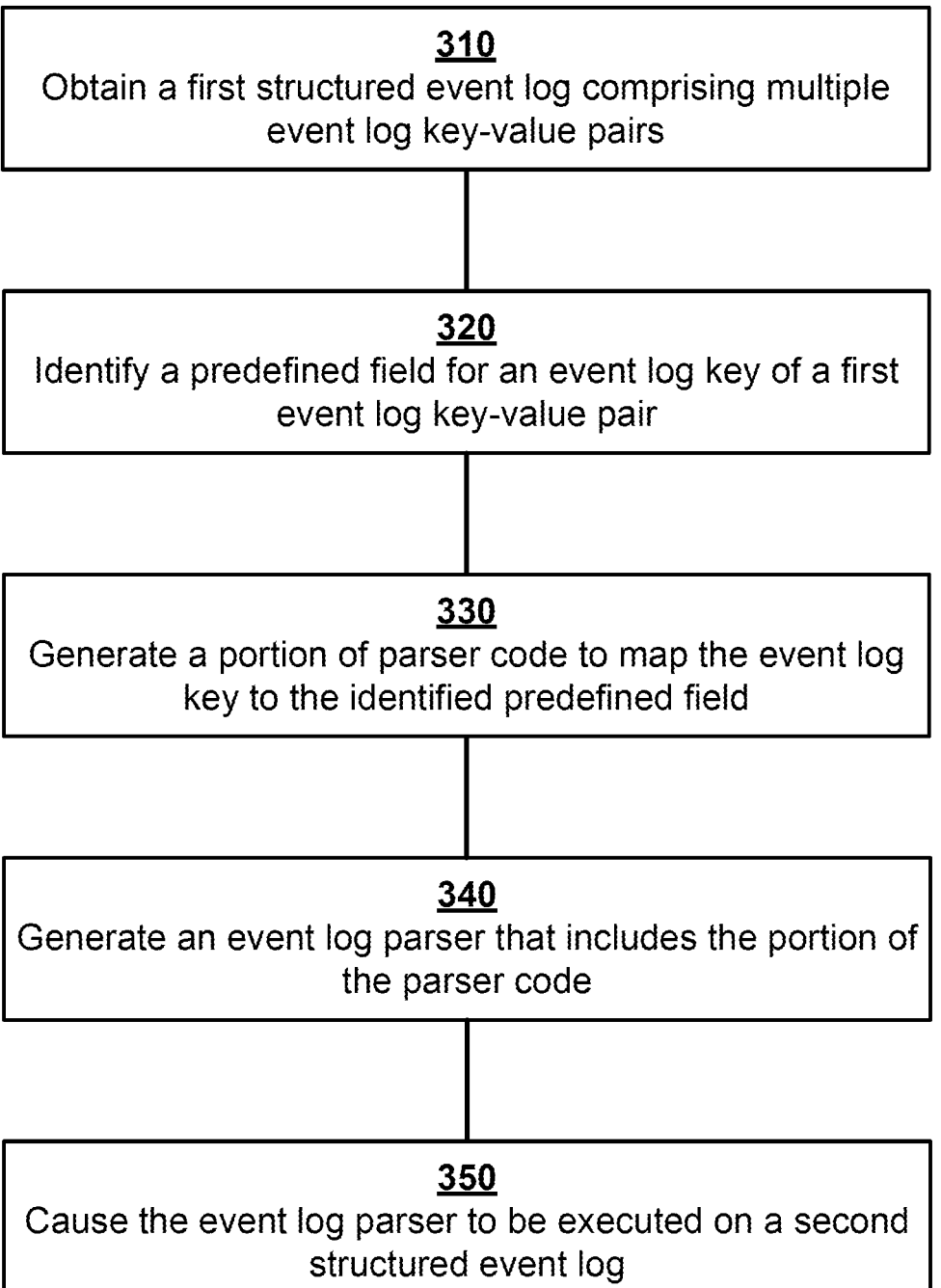

300

310
Obtain a first structured event log comprising multiple event log key-value pairs

320
Identify a predefined field for an event log key of a first event log key-value pair

330
Generate a portion of parser code to map the event log key to the identified predefined field

340
Generate an event log parser that includes the portion of the parser code

350
Cause the event log parser to be executed on a second structured event log

Figure 4A:
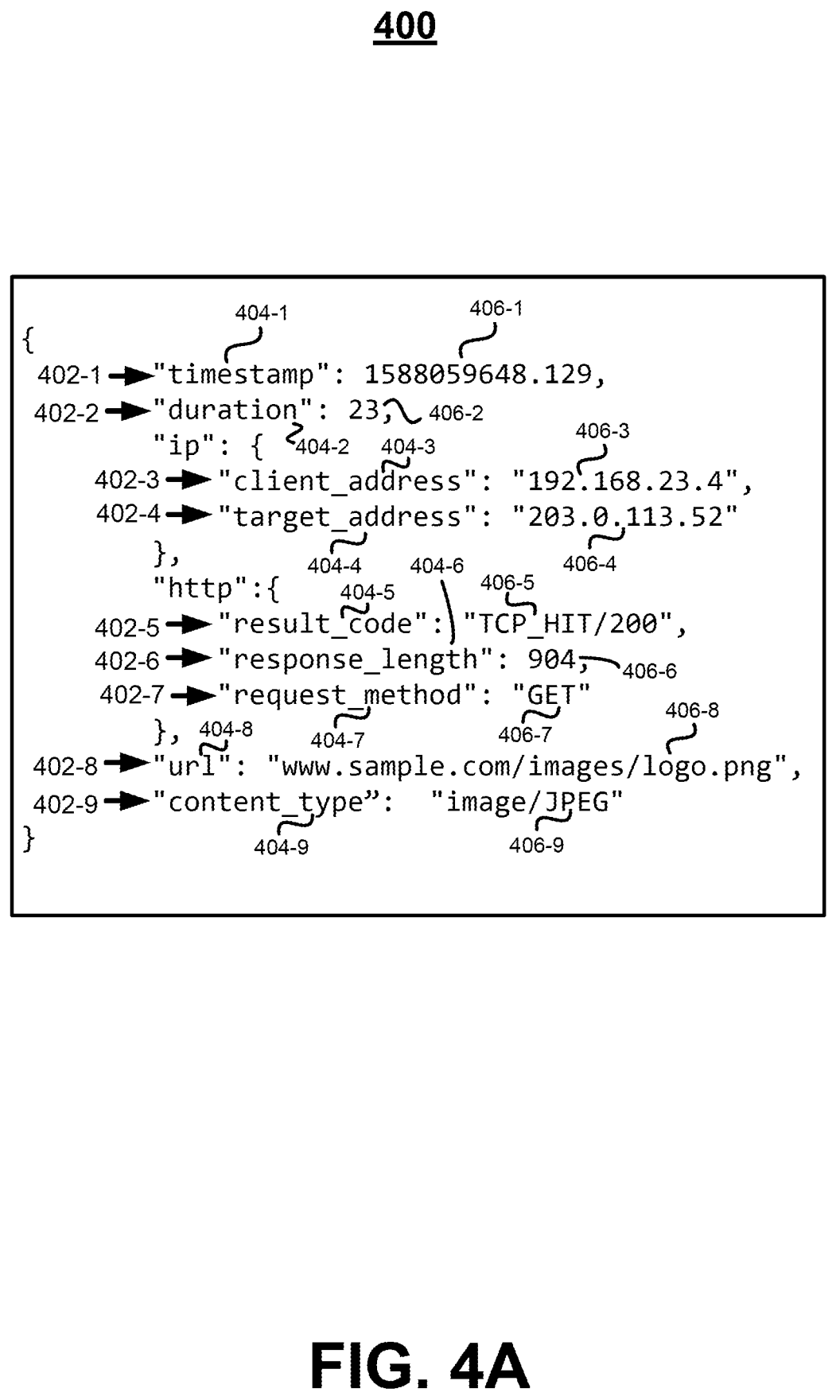

```
{
402-1 ➔ "timestamp": 1588059648.129,
402-2 ➔ "duration": 23,
         "ip": {
402-3 ➔    "client_address": "192.168.23.4",
402-4 ➔    "target_address": "203.0.113.52"
         },
         "http":{
402-5 ➔    "result_code": "TCP_HIT/200",
402-6 ➔    "response_length": 904,
402-7 ➔    "request_method": "GET"
         },
402-8 ➔ "url": "www.sample.com/images/logo.png",
402-9 ➔ "content_type": "image/JPEG"
}
```

| Event Log Field | Predefined Field |
|---|---|
| timestamp | metadata.event_timestamp |
| duration | |
| ip.client_address | principal.ip |
| ip.target_address | target.ip |
| http.result_code | network.http.response_code |
| http.response_length | network.http.received_bytes |
| http.request_method | network.http.method |
| url | target.url |
| content_type | |

```
{
        "metadata": {                                          434-1      464-1
462-1 ──▶   "event_timestamp":  "2020-04-28T07:40:48.129Z",
462-8 ──▶   "event_type":  "NETWORK_HTTP",          464-8
462-9 ──▶   "product_name": "Acme Web Proxy",
462-10 ──▶  "vendor_name":  "Acme"              464-9
        },      434-10      434-9  464-10
        "principal": {
462-2 ──▶   "ip": "192.168.23.4"          464-2
        },  434-2      434-7
        "target": {                        464-7
462-7 ──▶   "url": "www.sample.com/images/logo.png",
462-3 ──▶   "ip": "203.0.113.52"          464-3
        },  434-3
        "network": { 434-6
            "http": {          434-4
462-6 ──▶       "method":  "GET",          464-6
462-4 ──▶       "response_code": 200,          464-4
462-5 ──▶       "received_bytes": 904          464-5
            }          434-5
        },
}
```

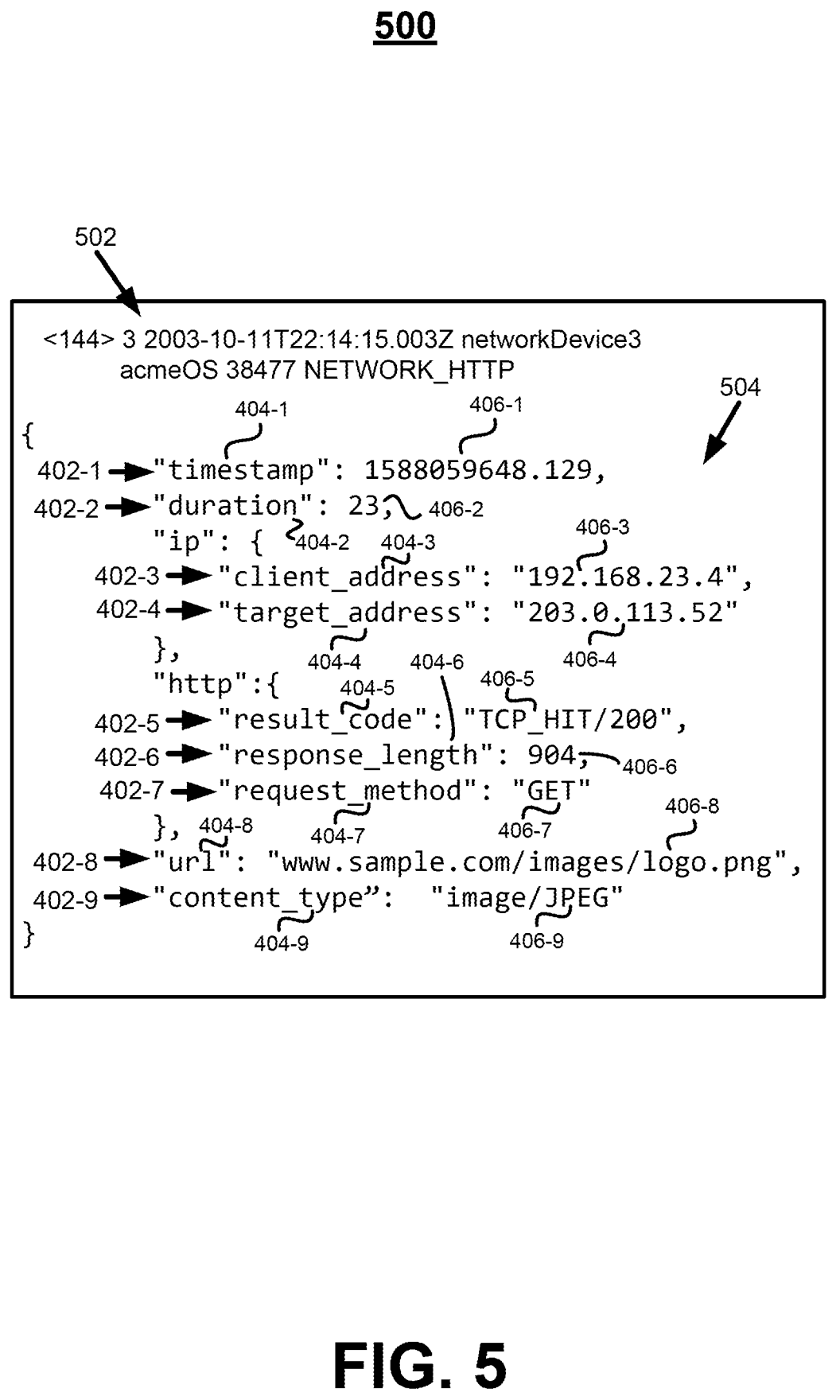

<144> 3 2003-10-11T22:14:15.003Z networkDevice3
acmeOS 38477 NETWORK_HTTP

504

```
{
  402-1 → "timestamp": 1588059648.129,       404-1  406-1
  402-2 → "duration": 23,  406-2
          "ip": {  404-2  404-3          406-3
  402-3 →   "client_address": "192.168.23.4",
  402-4 →   "target_address": "203.0.113.52"
          },         404-4  404-6     406-4
          "http":{     404-5    406-5
  402-5 →   "result_code": "TCP_HIT/200",
  402-6 →   "response_length": 904,  406-6
  402-7 →   "request_method": "GET"       406-8
          }, 404-8   404-7      406-7
  402-8 → "url": "www.sample.com/images/logo.png",
  402-9 → "content_type": "image/JPEG"
}         404-9              406-9
```

FIG. 5

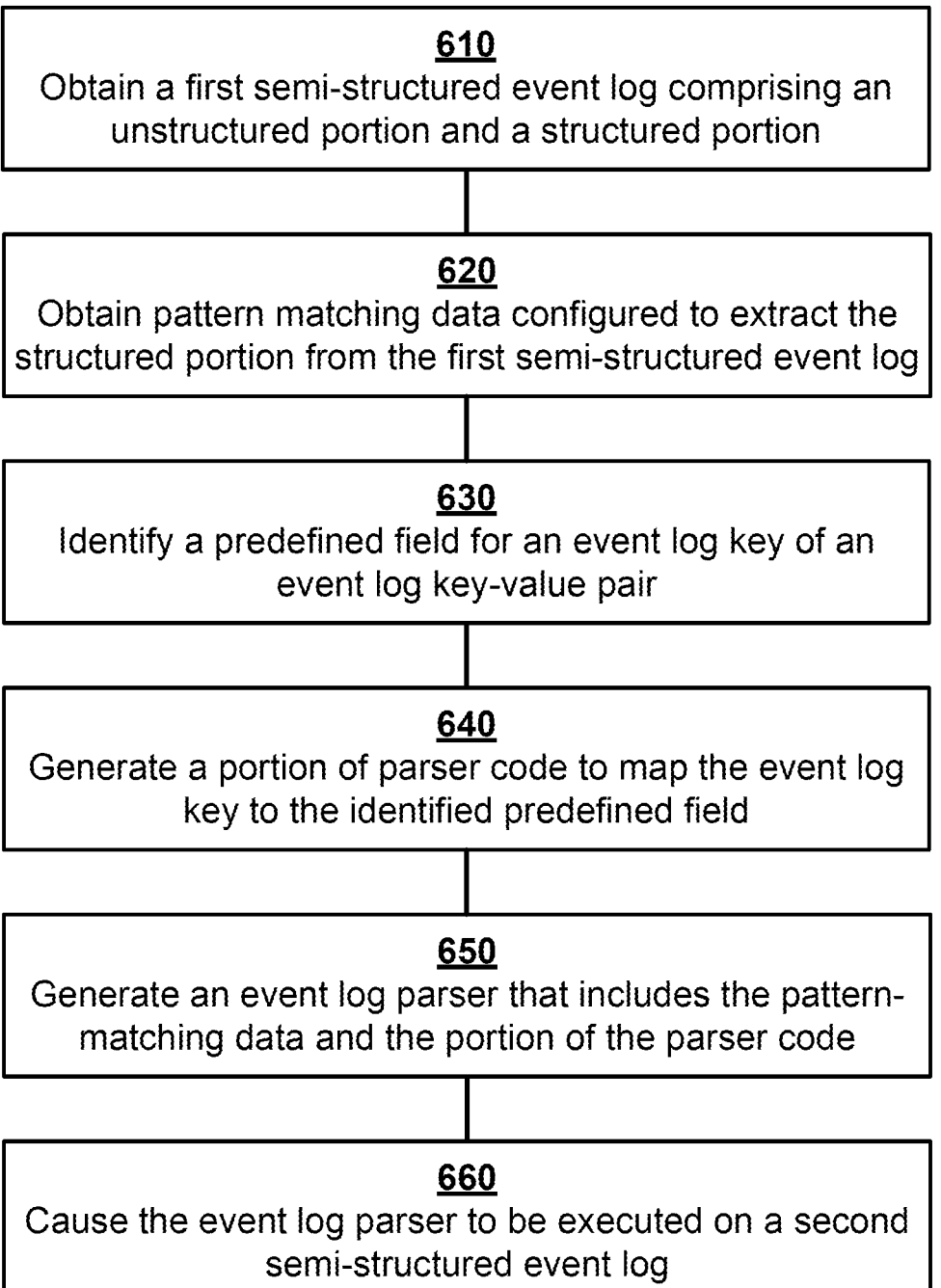

600

610
Obtain a first semi-structured event log comprising an unstructured portion and a structured portion

620
Obtain pattern matching data configured to extract the structured portion from the first semi-structured event log

630
Identify a predefined field for an event log key of an event log key-value pair

640
Generate a portion of parser code to map the event log key to the identified predefined field

650
Generate an event log parser that includes the pattern-matching data and the portion of the parser code

660
Cause the event log parser to be executed on a second semi-structured event log

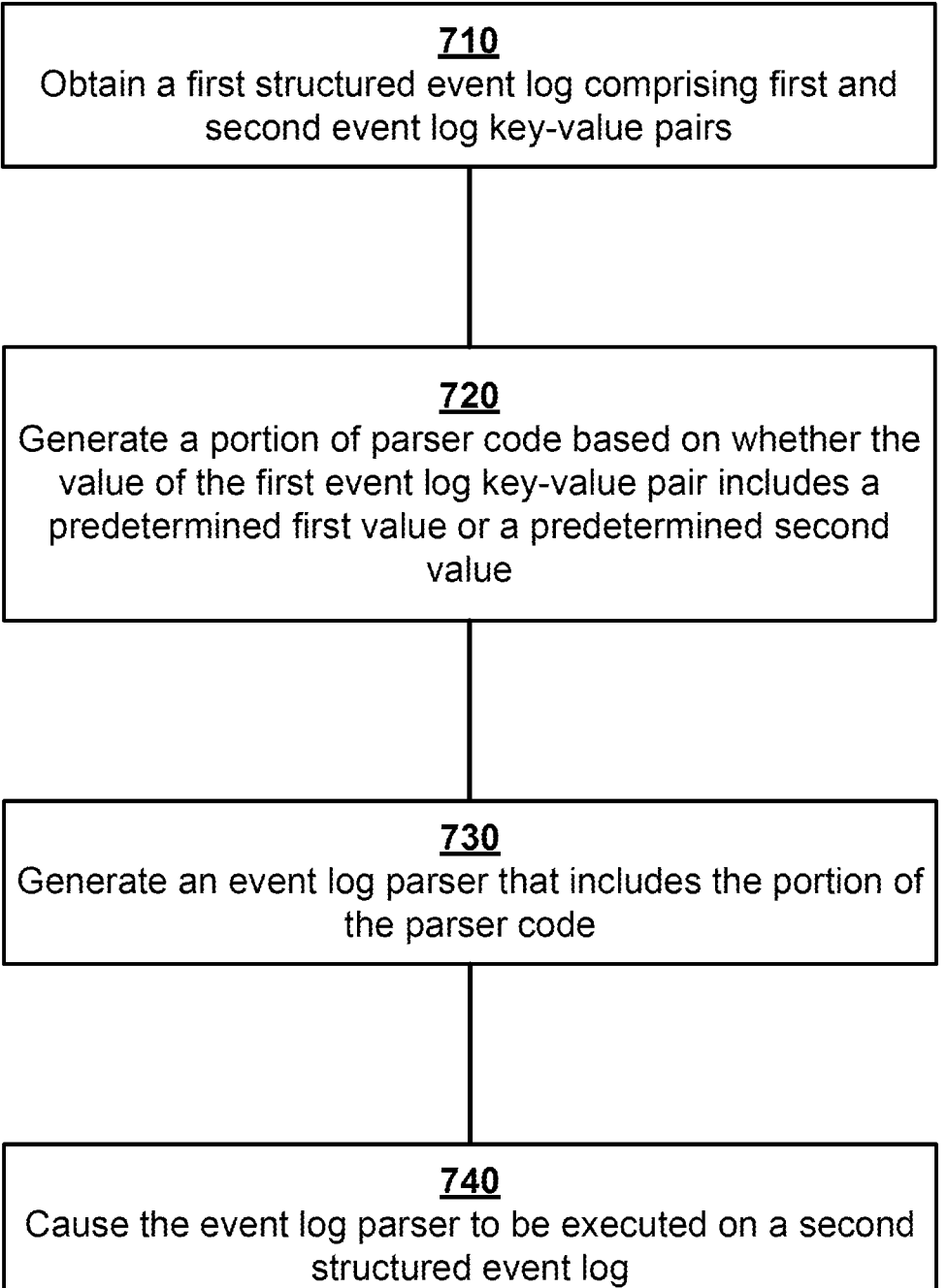

<u>710</u>
Obtain a first structured event log comprising first and second event log key-value pairs <u>720</u>
Generate a portion of parser code based on whether the value of the first event log key-value pair includes a predetermined first value or a predetermined second value <u>730</u>
Generate an event log parser that includes the portion of the parser code <u>740</u>
Cause the event log parser to be executed on a second structured event log

Figure 8:
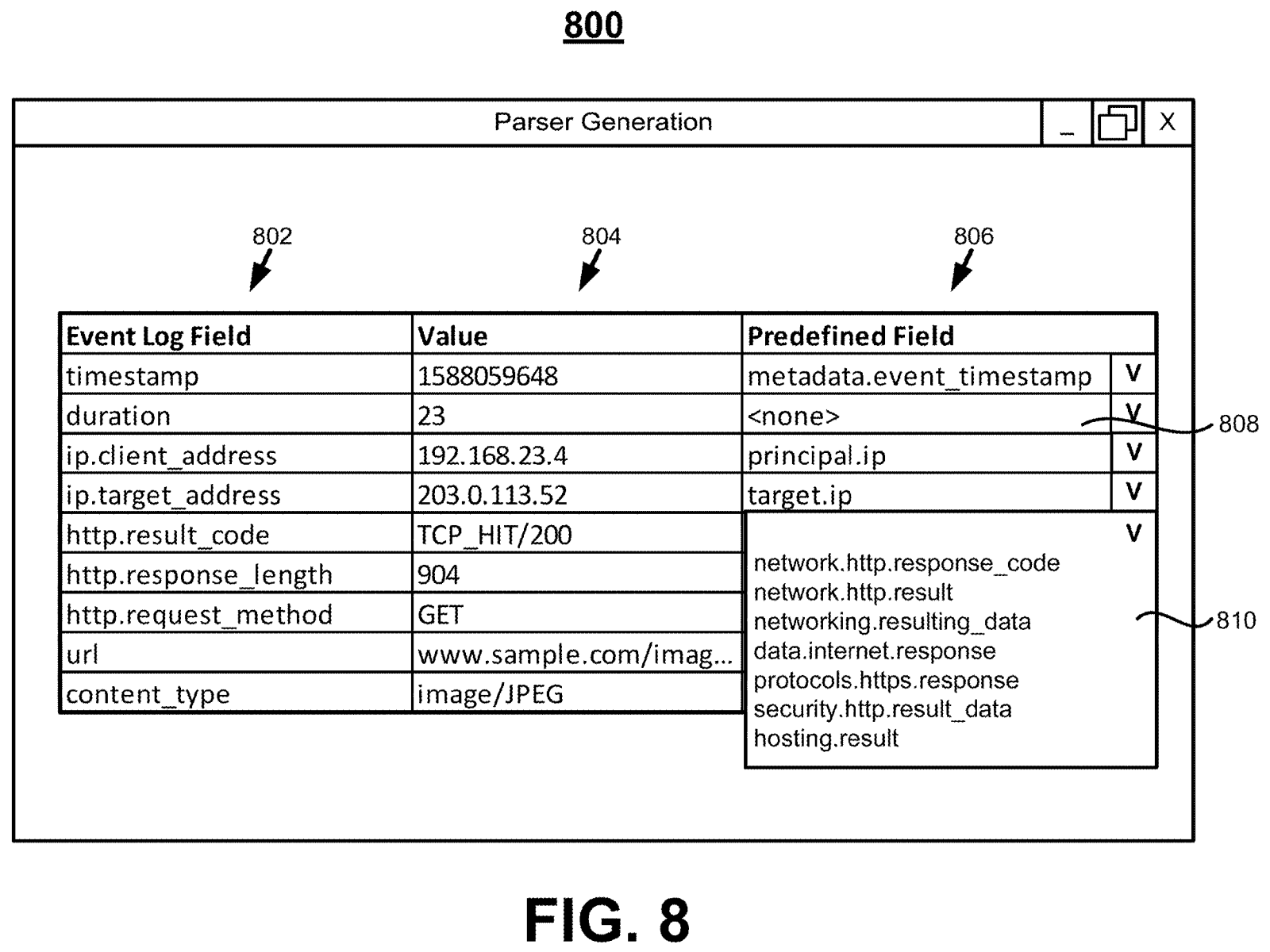

Parser Generation

| Event Log Field | Value | Predefined Field | |
|---|---|---|---|
| timestamp | 1588059648 | metadata.event_timestamp | ∨ |
| duration | 23 | \<none\> | ∨ |
| ip.client_address | 192.168.23.4 | principal.ip | ∨ |
| ip.target_address | 203.0.113.52 | target.ip | ∨ |
| http.result_code | TCP_HIT/200 | | ∨ |
| http.response_length | 904 | | |
| http.request_method | GET | | |
| url | www.sample.com/imag... | | |
| content_type | image/JPEG | | | network.http.response_code
network.http.result
networking.resulting_data
data.internet.response
protocols.https.response
security.http.result_data
hosting.result

LOW-CODE PARSER CREATION

TECHNICAL FIELD

The instant specification generally relates to computing devices. More specifically, the instant specification relates to low-code parser creation.

BACKGROUND

Computing devices-including servers, storage devices, or network devices- and software applications generate event logs in response to certain actions that occur on the computing devices or in the applications. The actions can include an operating system event, an error generated by a software application, or other actions that can occur on a computing device or in an application. An event log often takes the form of one or more key-value pairs where a key can include text that indicates what the corresponding value means. Data analytics platforms can analyze these event logs to determine a variety of phenomena that can occur on the computing devices or in the software applications, including identifying trends regarding use of the computing devices or identifying malicious activity such as a cyberattack.

SUMMARY

Disclosed herein are systems and methods for creating low-code parsers for event log data. One aspect of the disclosure includes a system. The system may include a memory and at least one processing device coupled to the memory and configured to perform operations. The operations may include obtaining a first structured event log of one or more first event logs of first telemetry log data. The first structured event log may include one or more event log key-value pairs. The operations may further include identifying, among one or more predefined fields, a predefined field for an event log key of a first event log key-value pair of the one or more event log key-value pairs. The operations may include generating a portion of parser code to map the event log key of the first event log key-value pair to the identified predefined field. The operations may further include generating an event log parser that includes the portion of the parser code. The operations may further include causing the event log parser to be executed on a second structured event log of one or more second of event logs of second telemetry log data.

Another aspect of the disclosure includes a method. The method may include obtaining a first semi-structured event log of one or more first event logs of first telemetry log data. The first semi-structured event log may include an unstructured portion and a structured portion. The structured portion may include one or more event log key-value pairs. The method may include obtaining pattern-matching data configured to extract the structured portion from the first semi-structured event log. The method may include identifying, among one or more predefined fields, a predefined field for an event log key of an event log key-value pair of the one or more of event log key-value pairs. The method may include generating a portion of parser code. The parser code may include computer-executable instructions that map the event log key of the event log key-value pair to the identified predefined field. The method may include generating an event log parser that includes the pattern-matching data and the portion of parser code. The method may include causing the event log parser to be executed on a second semi-structured event log of one or more second of event logs of second telemetry log data.

Another aspect of the disclosure includes a method. The method may include obtaining a first structured event log of one or more first event logs of first telemetry data. The first structured event log may include a first event log key-value pair and a second event log key-value pair. The first and second event log key-value pairs may each include a respective event log key and a corresponding value. The method may include generating a portion of parser code. In response to the value of the first event log key-value pair including a predetermined first value, the portion of parser code may map the event log key of the second event log key-value pair to a first predefined field. In response to the value of the first event log key-value pair including a predetermined second value, the portion of parser code may map the event log key of the second event log key-value pair to a second predefined field. The method may include generating an event log parser that includes the portion of the parser code. The method may include causing the event log parser to be executed on a second structured event log of one or more second event logs of second telemetry data.

BRIEF DESCRIPTION OF THE DRA WINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1 schematically illustrates an example system for low-code parser creation in which some aspects of the present disclosure may be implemented, in accordance with various embodiments.

FIG. 2A schematically illustrates another example system for low-code parser creation in which some aspects of the present disclosure may be implemented, in accordance with various embodiments.

FIG. 2B schematically illustrates another example system for low-code parser creation in which some aspects of the present disclosure may be implemented, in accordance with various embodiments.

FIG. 3 depicts a flowchart illustrating an example method for automatically generating an event log parser using low-code parser creation, in accordance with various embodiments.

FIG. 4A schematically illustrates an example event log that can be used to automatically generate an event log parser using low-code parser creation, in accordance with various embodiments.

FIG. 4B schematically illustrates an example set of mappings that can be implemented by an event log parser created using low-code parser creation, in accordance with various embodiments.

FIG. 4C schematically illustrates an example data object created by an event log parser, in accordance with various embodiments.

FIG. 5 schematically illustrates an example semi-structured event log that can be used to automatically generate an event log parser using low-code parser creation, in accordance with various embodiments.

FIG. 6 depicts a flowchart illustrating another example method for automatically generating an event log parser using low-code parser creation, in accordance with various embodiments.

FIG. 7 depicts a flowchart illustrating another example method for automatically generating an event log parser using low-code parser creation, in accordance with various embodiments.

FIG. 8 schematically illustrates an example user interface for identifying predefined fields for use in low-code parser creation, in accordance with various embodiments.

Figure 9:
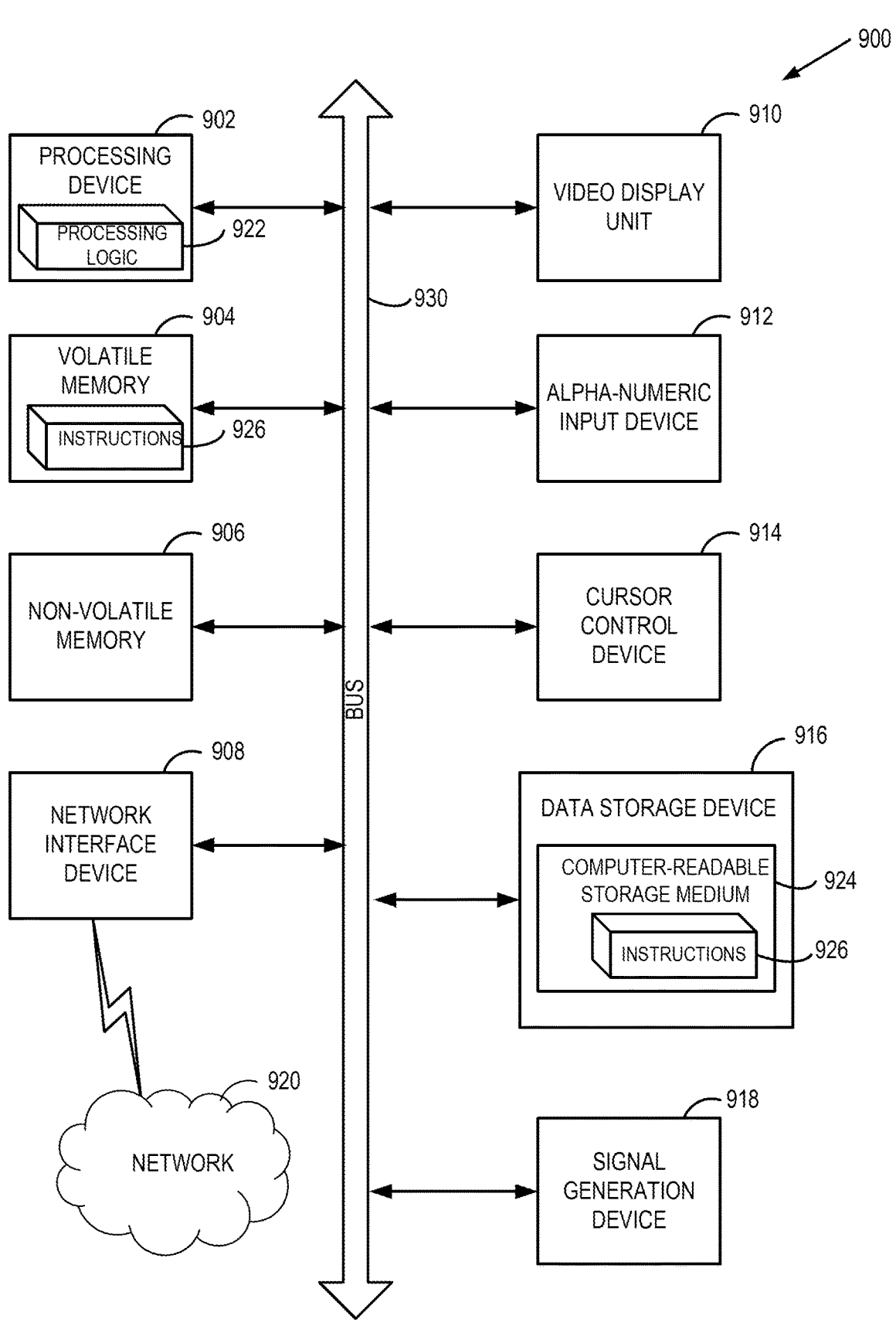

FIG. 9 depicts a block diagram of an example computer device capable of low-code parser creation, in accordance with some implementations of the present disclosure.

DETAILED DESCRIPTION

Computing networks-which can include computing devices, network devices, other types of devices, and software applications-generate event logs in response to certain actions that occur in the network. The actions can include an operating system event, an error generated by a software application, or other actions that can occur in the network. Data analytics platforms can analyze these event logs to determine a variety of phenomena that can occur in the computing network, such as identifying trends regarding use of the computing devices in the network or identifying malicious activity such as a cyberattack on the network.

Event logs can come in many formats and take a variety of forms, for example, depending on the vendor of the device that generated the event log, the model of the device, the vendor of the software application, the version of the application, the type of event represented by the event log, or a change in the event log introduced through event log collecting. In some cases, two different devices or applications that perform similar functionality can generate event logs in very different formats for the same or similar events. In order for a data analytics platform to intelligently analyze event logs, the data analytics platform may convert event logs into a predefined schema.

The data analytics platform may use event log parsers (sometimes referred to, herein, simply as "parsers") to convert event logs to the predefined schema. A parser may include a piece of software configured to accept an event log as input and convert the event log into a data object that complies with the predefined schema. The data analytics platform may also use event log parser extensions (sometimes referred to, herein, simply as "parser extensions") to augment a parser's functionality and capabilities. A parser extension may include a piece of software configured to accept an event log as input, extract certain data from the event log (which may include data a parser that executed on the same event log did not convert into the predefined schema), and insert it into the data object.

However, with the large number of devices and software applications available, it is sometimes difficult for the operator of the data analytics platform to manually create new event log parsers and parser extensions for new and modified event logs from new and modified devices and software applications. Also, because a parser may be software code-based, users of the data analytics platform may not have the technical knowledge or experience to create or modify a parser. Thus, a data analytics platform's parsers may not be able to handle the desired event logs, which can lead to the data analytics platform being unable to provide data analysis insights to some event logs, which may lead to computational inefficiencies by the devices generating the event logs.

In some cases, the data analytics platform may be unable to recognize malicious activity such as security breaches or cyberattacks on devices that generate some event logs, exposing these devices to downtime or malware.

Aspects and implementations of the present disclosure address the above deficiencies, among others, by providing an event log analytics system capable of generating event log parsers using low-code techniques. The event log analytics system can ingest a sample structured event log, identify one or more key-value pairs in the event log, and present a set of predefined fields to a user of the platform. The user can then, for each key of the one or more key-value pairs in the event log, select a predefined field from the set to which the key should be mapped. The platform may then generate parser code that maps the event log key to the selected predefined field and includes the parser code in the parser. The parser, when executed on an event log, may then use the parser code to extract values from the event log and assign the values to predefined fields according to the mapping configured by the parser code to convert the event log into the predefined format. The event log analytics system can then analyze the converted event log information to identify trends in the event logs, identify malicious activity such as security breaches or cyberattacks, and provide other network enhancements.

In addition, some benefits of the present disclosure may provide a technical effect caused by or resulting from a technical solution to a technical problem. For example, one technical problem may relate to the inability of a data analytics platform to analyze event logs from certain devices because the devices are new or have been modified and, thus, existing parsers cannot recognize certain data in the event logs and, thus, do not capture such data. One of the technical solutions to the technical problem may include generating and using a parser created using a low-code approach to capture the previously uncaptured event log data. As a consequence, the inability of a data analytics platform to capture important data in the event logs is reduced or eliminated.

Another technical problem may relate to the improper configuration of certain devices in a computing network. The improper configuration may result in inefficient usage of computing resources (including processing device usage, memory usage, storage usage, or network traffic). One of the technical solutions to the technical problem may include using parsers of the event log analytics system to convert event logs from the devices in the computing network into a predefined format. The event log analytics system can then analyze the converted event log data in the predefined format to identify alternative configurations that are more efficient. As a consequence, computing resources used by the computing network are reduced and computing resource usage is more efficient.

Another technical problem may relate to the improper configuration of the computing network resulting in the network being exposed to cyberattacks. One of the technical solutions to the technical problem may include using parsers of the event log analytics system to convert event logs from the devices in the computing network into a predefined format. The event log analytics system can then analyze the standardized event log data to identify cyberattack attempts. As a consequence, the operator of the computer network can take actions to prevent the cyberattacks or reduce their impact on the network, and effects of cyberattacks on the network are reduced or eliminated.

Figure 1:
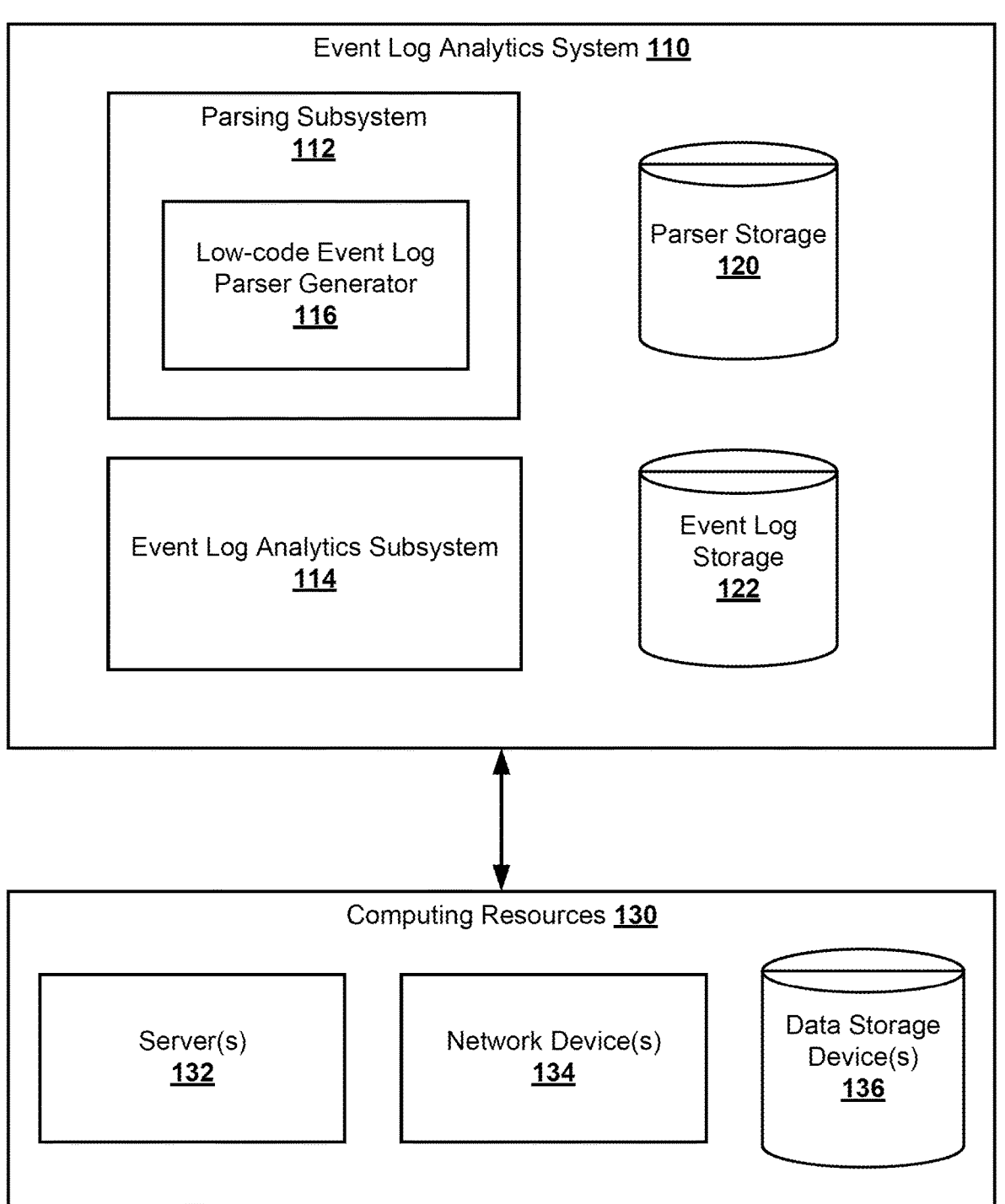

FIG. 1 is a schematic block diagram illustrating an example system 100 for low-code parser creation in which some aspects of the present disclosure may be implemented, in accordance with various embodiments. The system 100 may include an event log analytics system 110. The event log analytics system 110 may include a parsing subsystem 112, an event log analytics subsystem 114, a parser storage 120, or a predefined event log storage 122. The parsing subsystem 112 may include a low-code event log parser generator 116. The system 100 may include computing resources 130. The computing resources 130 may include one or more servers 132, one or more network devices 134, or one or more data storage devices 136. The event log analytics system 110 and the computing resources 130 may be in data communication with each other over a data network.

In some implementations, the event log analytics system 110 may include a computing network that includes one or more computing devices. The event log analytics system 110 may be configured to receive event log data from the computing resources 130, use parsers and parser extensions to convert the event log data into a predefined format and perform data analytics operations on the event log data in the predefined format.

In some implementations, a computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In some cases, the event log analytics system 110 may include a cloud computing system. A cloud computing system may include one or more computing devices (or portions of cloud computing devices) provided to an end user by a cloud provider. A portion of the cloud computing system associated with the end user can host content for use or access by other parties or perform other computational tasks. In some implementations, the cloud computing system may be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment may provide serverless computing.

In one implementation, the parsing subsystem 112 may include one or more software applications configured to generate parsers and parser extensions, edit and manage parsers and parser extensions, validate parsers and parser extensions, and execute parsers and parser extensions. One of these applications may include the low-code event log parser generator 116. The low-code event log parser generator 116 may be configured to generate an event log parser without a user of the event log analytics system 110 needing to be able to write code to create the parser. A user interface presented on a computing device of the computing resources 130 that is in data communication with the low-code event log parser generator 116 can receive user input that can be used to create a new parser or parser extension. The parsing subsystem 112 may then receive event log data compatible with the parser or parser extension and may execute the parser or parser extension to convert the event log data into a predefined format and store the converted event log data.

The event log analytics subsystem 114 may include one or more software applications configured to perform data analytics operations and other operations on the converted event log data to identify trends in the data, determine improved configurations for devices in the computing resources 130 that provide event log data, and perform other operations on the converted event log data. A user of the computing resources 130 may use a user interface of a computing device of the computing resources 130 that is in data communication with the event log analytics subsystem 114 to view the results of the data analytics and other operations.

The parser storage 120 may include a data store configured to store one or more parsers and one or more parser extensions. A data store may include a physical storage medium that can include volatile storage (e.g., random access memory (RAM), etc.) or non-volatile storage (e.g., a hard disk drive (HDD), flash memory, etc.). A data store can include a file system, a database, or some other software configured to store data.

A parser can include data, code, a software application, or other data configured to be executed by the parsing subsystem 112. A parser may be configured to accept an event log as input and convert at least a portion of the event log into a predefined format. The parser may be configured to perform other event log processing-related functionality.

A parser extension can include data, code, a software application, or other data configured to be executed by the parsing subsystem 112. A parser extension may be configured to augment the functionality of a parser or augment the data that a parser can operate on when executing on an event log. The parser extension may be configured to accept an event log as input and convert at least a portion of the event log into a predefined format. The parser extension may be configured to perform other event log related-operations.

The event log storage 122 may include a data store configured to store event log data. The stored event log data may include event logs prior to being operated on by the parsing subsystem 112 (sometimes referred to, herein, as "raw event logs") or may include event logs in a predefined format (e.g., after being operated on by the parsing subsystem 112). The event log storage 122 may provide raw event logs to the parsing subsystem 112, the parsing subsystem 112 may convert the raw event logs to a predefined format and store the converted event log data in the event log storage 122. The event log storage 122 may provide converted event log data in the predefined format to the event log analytics subsystem 114 for analysis.

In one or more implementations, the computing resources 130 may include a computing network. The computing resources 130 may include a computing network operated by a customer of the entity that operates the event log analytics system 110 and provides event log analytics services to the customer. The computing resources 130 may include one or more servers 132. A server 132 may include a computing device, including a physical computing device or a VM. The computing resources 130 may include one or more network devices 134. A network device 134 may include a switch, router, hub, gateway, wireless access point, bridge, modem, repeater, or other network devices. A network device 134 may help provide data communication between the one or more servers 132, between other devices of the computing resources 130, or between a computing device external to the computing resources 130 and a device of the computing resources 130. The computing resources 130 may include one or more data storage devices 136. A data storage device 136 may include a data store. One or more servers 132 or other computing devices of the computing resources 130 may store data on the one or more data storage devices 136 or retrieve data from the one or more data storage devices 136.

In one or more implementations, a computing network of the event log analytics system 110 or the computing resources 130 may include one or more computing devices in data communication with each other over a data network. The data network may include a local area network (LAN), wide area network (WAN), a virtual private network (VPN), or some other data network. The data network may include network devices, including switches, routers, hubs, gateways, wireless access points, bridges, modems, repeaters, or other network devices.

Figure 2A:
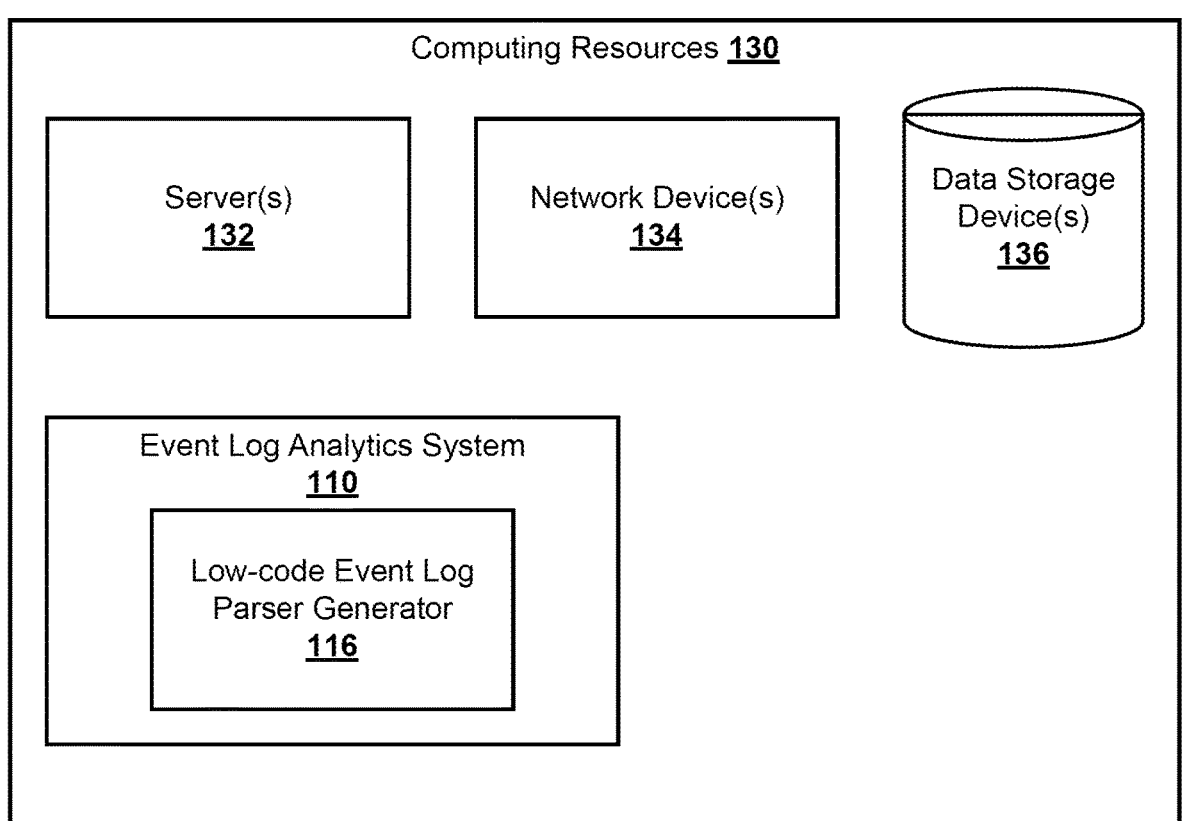

In some implementations, the event log analytics system 110 and the computing resources 130 may be separate computing networks and may communicate with each other over a data network. However, as seen in the example system 200 of FIG. 2A, in certain implementations, the computing resources 130 may include the event log analytics system 110. For example, the components of the event log analytics system 110 may be installed on one or more computing devices of the computing resources 130. The event log analytics system 110 may provide its functions locally to the computing resources 130. As seen in the example system 250 of FIG. 2B, in one or more implementations, a cloud computing system 210 may include the event log analytics system 110 and one or more sets of computing resources 130-1, . . . , 130-n. The one or more sets of computing resources 130-1, . . . , 130-n may be cloud computing environments provided by the cloud provider of the cloud computing system 210, and the cloud provider may operate the event log analytics system 110 and allow the one or more sets of computing resources 130-1, . . . , 130-n to use the event log analytics system's 110 functionality. The cloud computing system 210 may include a cloud management system 212, which may include one or more computing devices or software configured to manage the cloud computing system 210, including provisioning one or more sets of computing resources 130-1, . . . , 130-n to users or coordinate usage of the event log analytics system 110 by the one or more sets of computing resources 130-1, . . . , 130-n.

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether event log analytics system 110 collects user information (e.g., information about a user's social network, social actions or activities, profession, a user's preferences, or a user's current location), or to control whether and/or how to receive content from the event log analytics system 110 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the event log analytics system 110.

FIG. 3 is a flowchart illustrating one embodiment of a method 300 for low-code parser creation, in accordance with some implementations of the present disclosure. A processing device, having one or more central processing units (CPU(s)) and/or memory devices communicatively coupled to the CPU(s) and/or graphics processing units (GPU(s)) can perform the method 300 and/or each of their individual functions, routines, subroutines, or operations. In certain implementations, a single processing thread can perform the method 300. Alternatively, two or more processing threads can perform the method 300, each thread executing one or more individual functions, routines, subroutines, or operations of the method. In an illustrative example, the processing threads implementing the method 300 can be synchronized (e.g., using semaphores, critical sections, and/or other thread synchronization mechanisms). Alternatively, the processing threads implementing the method 300 can be executed asynchronously with respect to each other. Various operations of the method 300 can be performed in a different (e.g., reversed) order compared with the order shown in FIG. 3. Some operations of the method 300 can be performed concurrently with other operations. Some operations can be optional. In some embodiments, the parsing subsystem 112 or the event log analytics subsystem 114 may perform the method 300.

Block 310 may include obtaining a first structured event log. The first structured event log may include an event log of one or more first event logs of first telemetry log data. The first structured event log may include one or more event log key-value pairs.

In some implementations, telemetry log data may include data generated by a device or a component of a device regarding metrics, measurements, events, or other things of a device or component during execution. In some implementations, telemetry log data may include one or more event logs. In one or more implementations, an event log may include a data record that represents an event related to a device or software of the computing resources 130. A device (including a component of a device) may generate the event log, or software may generate the event log. The event log may include data about the event represented by the event log. In some implementations, an event log may include a structured event log. A structured event log may include event data in a structured format. Event data in a structured format may include data that is organized into a recognized format. The structured event log may include event data in a Javascript Object Notation (JSON) format, an Extensible Mark-up Language (XML) format, a comma-separate values (CSV) format, or event data in some other structured format.

In one implementation, telemetry log data may include security telemetry log data, which may include one or more event logs that provide information about security-related events of a computing device. The one or more event logs may include raw event logs, e.g., event logs that have not yet been converted to a predefined format by the parsing subsystem 112. The telemetry log data may include telemetry log data provided to the event log analytics system 110 by the computing resources 130. The event log storage 122 may store the telemetry log data.

In some implementations, an event log may include one or more event log key-value pairs. An event log key-value pair may include an event log key and a value that corresponds to that event log key. An event log key may include data that indicates a category of data, and the corresponding value may include data that belongs to that category.

FIG. 4A depicts an example structured event log 400. The event log 400 may include a web proxy-type event log. The example event log 400 may represent the event of a computing device requesting a web resource on a server 132. The event log 400 can include one or more key-value pairs 402-1, . . . , 402-9. A key-value pair 402 may include a key 404 and a corresponding value 406. The key-value pairs 402-1, . . . , 402-9 of an event log 400 may include data that provide information about the event represented by the event log 400. For example, as depicted in FIG. 4A, the key-value pair 402-1 may include a "timestamp" key 404-1 and a corresponding value 406-1 of "1588059648.129," which may represent a timestamp of when the event represented by the event log 400 occurred or when the event log 400 was generated (e.g., in the example event log 400 of FIG. 4A, the value 406-1 may include a timestamp in the UNIX epoch format). The key-value pair 402-2 may include a "duration" key 404-2 and a value 406-2 of "23," which may represent a duration of the event represented by the event log 400 (e.g., in the example event log 400, the value 406-2 may be provided in milliseconds). The key-value pair 402-3 may include a "ip.client_address" key 404-3 and the value 406-3 of "192.168.23.4," which may represent the Internet Protocol (IP) address of the device that initiated the event represented by the event log 400. The key-value pair 402-4 may include a "ip.target_address" key 404-4 and the corresponding value 406-4 of "203.0.113.52," which may represent the IP address of the device that hosts the requested web resource requested in the event log 400. The key-value pair 402-5 may include a "http.result_code" key 404-5 and a corresponding value 406-5 of "TCP_HIT/200," which may represent the result code of the event represented by the event log 400. The key-value pair 402-6 may include a "http.response_length" key 404-6 and the corresponding value 406-6 of "904," which may represent a length, in bytes, of the received request for the web resource. The key-value pair 402-7 may include a "http.request_method" key 404-7 and the corresponding value "GET." The key-value pair 402-8 may include a "URL" key 404-8 and the corresponding value 406-8 "www.sample.com/image/logo.png," which may represent a uniform resource locator (URL) of a requested web resource of the event represented by the event log 400. The key-value pairs 402-9 may include a "content_type" key 404-9 and a corresponding value 406-9 of "image/JPEG," which may indicate the type of the content requested in the event associated with the event log 400.

In some implementations, an event log 400 may have more or fewer key-value pairs 402 than shown in FIG. 4A. An event log 400 may have different key-value pairs 402. As can be seen in FIG. 4A, in some implementations, an event log 400 may have key-value pairs 402 at different levels. For example, the "timestamp" key-value pair 402-1 may occur at a first level, and the "ip.client_address" key-value pair 402-3 may occur at a second level that is nested inside a first level. In one implementation, the parsing subsystem 112 may identify the one or more key-value pairs 402-1, . . . , 402-9 of an event log 400. Identifying the one or more key-value pairs 402-1, . . . , 402-9 may include traversing a structure of the event log and parsing the structure into different pieces of data.

Referring again to FIG. 3, block 320 may include identifying, among one or more predefined fields, a predefined field for an event log key 404 of the event log key-value pair 402. A predefined field may include a data field in a predefined, standardized format. The predefined format may include a format compatible with event log analytics functions of the event log analytics subsystem 114. In one implementation, the event log analytics system 110 may include multiple predefined fields. The multiple predefined fields may be stored by the parsing subsystem 112 (e.g., in the parser storage 120). The event log analytics system 110 may store the multiple predefined fields in a data structure (e.g., a list, a set, or some other data structure). The predefined fields may include predefined data fields recognized by the event log analytics subsystem 114. The low-code event log parser generator 116 may identify a predefined field from the multiple predefined fields and, as explained further below in regard to block 330, generate a mapping that maps an event log key 404 of a raw event log 400 to the identified predefined field.

Block 330 may include generating a portion of parser code to map the event log key 404 of the event log key-value pair 402 to the predefined field identified in block 320. As discussed above, the event log analytics subsystem 114 may use event logs in a standardized, predefined format that includes predefined fields, but different devices may provide raw event log data that is not in the predefined format. Thus, the parsing subsystem 112 may use parsers and parser extensions to convert the raw event log data into the predefined format. Part of that parsing may include mapping event log keys 404 in a raw event log 400 to predefined fields.

FIG. 4B depicts an example set 430 of mappings 432-1, . . . , 432-7 for the event log 400 of FIG. 4A. The set 430 of mappings 432-1, . . . , 432-7 may include one or more mappings 432 that indicate which event log keys 404 of the raw event log 400 map to which predefined field 434 of the predefined format. For example, the "timestamp" key 404-1 of the event log 400 may map to the predefined field 434-1 "metadata.event_timestamp." The "ip.client_address" key 404-3 may map to the predefined field 434-2 "principal.ip," the "ip.target_address" key 404-4 may map to the predefined field 434-3 "target.ip," the "http.result_code" key 404-5 may map to the predefined field 434-4 "network.http.response_code," the "http.response_length" key 404-6 may map to the predefined field 434-5 "network.http.received_bytes," the event log key 404-7 "http.request_method" may map to the predefined field 434-6 "network.http.method," and the key 404-8 "URL" may map to the predefined field 434-7 "target.url."

As can be seen from the example set 430 of mappings 432-1, . . . , 432-7 of FIG. 4B, in some implementations, certain keys 404 in an event log 400 may not map to a predefined field 434. For example, the "duration" key 404-2 and the "content_type" key 404-9 may not map to corresponding predefined fields 434. This may result from the event log analytics subsystem 114 not needing the data stored in these key-value pairs 402. In one or more implementations, an event log key 404 may include the same name as the corresponding predefined field 434, or an event log key 404 may include a different name from the corresponding predefined field 434.

A parser may include data or software that may execute on an event log to convert a raw event log to the predefined format according to the set 430 of mappings 432-1, . . . , 432-7. The data or software may include parser code. Parser code may include one or more computer instructions that cause a parser or parser extension to execute parser functionality. Parser functionality may include mapping event log keys 404 to predefined fields 434.

In some implementations, the parser code may include computer-executable instructions. Computer-executable instructions may include binary machine code, assembly code, or other similar code. In certain implementations, the parser code may include human-readable source code. The source code may be configured to be compiled into computer-executable instructions. In one implementation, the low-code event log parser generator 116 may present the at least a portion of the source code of the parser code on a user interface. The user interface may include a portion where a user can modify the source code (e.g., a text input area where the user can modify the text of the source code). The low-code event log parser generator 116 may store the parser source code as modified by the user.

In some implementations, the low-code event log parser generator 116 may generate the parser code that implements the mapping 432 identified in block 320. In one implementation, the low-code event log parser generator 116 may use a code template to generate the parser code. The code template may include a pre-generated portion of parser code. The pre-generated portion of parser code may have been written by a user of the event log analytics system 110, e.g., a user tasked with writing parser code for various event log parsers. The user may include a user employed by or otherwise associated with the entity that operates the event log analytics system 110. The pre-generated portion of parser code may include one or more areas or "blanks" that the low-code event log parser generator 116 may fill in with the event log key 404 and the predefined field 434 identified in block 320.

As an example of a code template, the code template may include the parser code: "mapKeyToField ([KEY], [FIELD]);" where "mapKeyToField is a programming method, operation, procedure, etc. that maps the key 404 identified by the first argument to the predefined field 434 identified by the second argument. The first argument may include an area or "blank" (in this example, "[KEY]") that the low-code event log parser generator 116 will fill in with the key of block 320, and the second argument may include an area or "blank" (in this example, "[FIELD]") that the low-code event log parser generator 116 will fill in with the predefined field 434 identified in block 320. For example, to implement the mapping 432-1 of FIG. 4B, in the code template, the low-code event log parser generator 116 may replace "[KEY]" with "timestamp" and may replace "[FIELD]" with "metadata.event_timestamp" to create the portion of parser code "mapKeyToField (timestamp, metadata.event_timestamp)".

Referring again to FIG. 3, in some implementations, the method 300 may repeat blocks 320 and 330 for one or more keys 404-1, . . . , 404-9 of the event log 400.

Block 340 includes generating an event log parser that includes the one or more portions of the parser code generated in block 330. Generating the event log parser may include associating the one or more portions of the parser code with the event log parser.

Block 350 includes causing the event log parser to be executed on a second structured event log 400 of one or more second event logs 400 of second telemetry log data. In some implementations, the second telemetry log data may include telemetry log data that is separate from the first telemetry log data, or there may be at least some overlap between the first and second telemetry log data. Similarly, the one or more second event logs 400 may include event logs 400 that are not present in the one or more first event logs of block 310, or there may be at least some overlap between the first and second one or more event logs 400. In some implementations, the event logs 400 of the one or more second event logs 400 may include the event type associated with the parser.

In some implementations, causing the event log parser to be executed may include the parsing subsystem 112 to execute the parser. In certain implementations, causing the event log parser to be executed may include another component of the event log analytics system 110 executing the parser in response to a command from the parsing subsystem 112. In other implementations, causing the event log parser to be executed may include an computing device external from the event log analytics system 110 executing the parser in response to a command from the parsing subsystem 112.

In one implementation, execution of a parser may include execution of one or more portions of the parser's parser code by a computing device. Execution of the portions of the parser code may include executing the portions of the parser code on multiple event log key-value pairs 402 of the second structured event log 400. Execution of the parser code may include mapping a value 406 in a key-value pair 402 of the second structured event log 400 to a predefined field 434 based on a mapping 432. This may include identifying a key 404 of a key-value pair 402 of the event log 400, identifying the value 406 in the key-value pair 402, and setting the value of a predefined field 434 as that value 406 based on the mapping 432 that maps the identified event log key 404 to the predefined field 434. The predefined field 434 and the value 406 can then be inserted into a data object in the predefined format that is compatible with the event log analytics subsystem 114. Execution of the parser may include execution of the functionality in addition to mapping event log keys 404 to predefined fields 434.

In some implementations, execution of the parser may include the parser generating a data object. The data object may be in a standardized, predefined format that is compatible with the event log analytics subsystem 114. FIG. 4C depicts a data object 460 that represents the event log 400 converted into the predefined format according to the set 430 of mappings 432-1, . . . , 432-7. The data object 460 may be in the JSON format. The data object 460 may include one or more predefined field-value pairs 462-1, . . . , 462-10. Each predefined field-value pair 462 may include a predefined field 434 and a corresponding value 464. The corresponding value 464 may include a value mapped from the raw event log 400 to a predefined field 434 according to the set 430 of mappings 432-1, . . . , 432-7.

In one implementation, some of the predefined fields 434 may include predefined fields 434 from the set 430 of mappings 432. Some of the predefined fields 434 may include a predefined field 434 that is not from the set 430 of mappings. For example, as can be seen in FIG. 4C, the data object 460 may include the predefined field-value pairs 462-8, 462-9, and 462-10, which may include a "metadata.event_type" predefined field 434-8 (whose value 464-8 may include data indicating the event type represented by the event log 400), a "metadata.product_name" predefined field 434-9 (whose value 464-9 may include data indicating the device or software that generated the event log 400), and a "metadata.vendor_name" predefined field 434-10 (whose value 464-10 may include data indicating the device or software vendor that generated the event log 400).

In some implementations, an event log may include a semi-structured event log. A semi-structured event log may include event data that includes both an unstructured portion and a structured portion. Event data in the structured portion may include data that is organized into a recognized format (e.g., JSON, XML, CSV, etc.). The structured portion may include one or more key-value pairs 402. Event data in the unstructured portion may include data that does not comply with a predefined format used by the event log analytics system 110.

FIG. 5 depicts an example semi-structured event log 500. The event log 500 includes an unstructured portion 502 and a structured portion 504. The unstructured portion 502 may include a syslog header. The structured portion 504 may include the event log data of the event log 400 of FIG. 4A.

FIG. 6 is a flowchart illustrating one embodiment of a method 600 for low-code parser creation, in accordance with some implementations of the present disclosure. A processing device, having one or more CPU(s) and/or memory devices communicatively coupled to the CPU(s) and/or GPU(s) can perform the method 600 and/or each of their individual functions, routines, subroutines, or operations. In certain implementations, a single processing thread can perform the method 600. Alternatively, two or more processing threads can perform the method 600, each thread executing one or more individual functions, routines, subroutines, or operations of the method. In an illustrative example, the processing threads implementing the method 600 can be synchronized (e.g., using semaphores, critical sections, and/or other thread synchronization mechanisms). Alternatively, the processing threads implementing the method 600 can be executed asynchronously with respect to each other. Various operations of the method 600 can be performed in a different (e.g., reversed) order compared with the order shown in FIG. 6. Some operations of the method 600 can be performed concurrently with other operations. Some operations can be optional. In some embodiments, the parsing subsystem 112 or the event log analytics subsystem 114 may perform the method 600.

Block 610 may include obtaining a first semi-structured event log 500 of one or more first event logs 500 of first telemetry data. The first semi-structured event log 500 may include an unstructured portion 502 and a structured portion 504. The structured portion 504 may include one or more event log key-value pairs 402-1, . . . , 402-9. Block 610 may include functionality similar to the functionality of block 310 of the method 300 of FIG. 3.

Block 620 may include obtaining pattern-matching data. The pattern-matching data may be configured to extract the structured portion 504 from the first semi-structured event log 500. The unstructured portion 502 may include header data. The header data may include a syslog header or some other type of header data. The parsing subsystem 112 may obtain pattern-matching data that a parser may use to extract the structured portion 504 from the unstructured portion 502.

In one or more implementations, a user may provide pattern-matching data to the parsing subsystem 112. The pattern-matching data may include a regular expression or some other type of pattern-matching data. The pattern-matching data may help the parser to identify which portion(s) of the semi-structured event log 500 includes unstructured data that should be stripped out, removed, or ignored. The pattern-matching data may help the parser to identify which portion(s) of the semi-structured event log 500 includes structured data that the parser should operate on.

Block 630 may include identifying, among one or more predefined fields 434, a predefined field 434 for an event log key 404 of an event log key-value pair 402 of the one or more event log key-value pairs 402-1, . . . , 402-9. Block 630 may include functionality similar to the functionality of block 320 of the method 300. Block 640 may include generating a portion of parser code. The parser code may include computer-executable instructions that map the event log key 404 of the event log key-value pair 402 to the identified predefined field 434. Block 640 may include functionality similar to the functionality of block 330 of the method 300. In some implementations, the method 600 may repeat block 630 and block 640 for one or more event log keys 404 of the event log 500.

Block 650 can include generating an event log parser that includes the pattern-matching data of block 620 and the portion of parser code of block 640. Block 650 may include functionality similar to the functionality of block 340 of the method 300.

Block 660 may include causing the event log parser to be executed on a second semi-structured event log 500 of one or more second event logs 500 of second telemetry log data. Block 660 may include functionality similar to the functionality of block 350 of the method 300. The parser executing on the second semi-structured event log 500 may include the parser using the pattern-matching data to extract a structured portion 504 of the second semi-structured event log 500. The parser executing on the second semi-structured event log 500 may include using the one or more portions of parser code to map values 406 in the key-value pairs 402 of the structured portion 504 to predefined fields 434 according to the mappings 432.

In some implementations, a parser may map an event log key 404 to a certain predefined field 434 in response to a value 406 of an event log 400, 500 having a predetermined value, and the parser may map the key 404 to a different predefined field 434 in response to the value 406 having a different predetermined value. This may provide flexibility to the parser and allow the same event log key 404 to map to different predefined fields 434 depending on the value 406 of an event log key-value pair 402.

FIG. 7 is a flowchart illustrating one embodiment of a method 700 for low-code parser creation, in accordance with some implementations of the present disclosure. A processing device, having one or more CPU(s) and/or memory devices communicatively coupled to the CPU(s) and/or GPU(s) can perform the method 700 and/or each of their individual functions, routines, subroutines, or operations. In certain implementations, a single processing thread can perform the method 700. Alternatively, two or more processing threads can perform the method 700, each thread executing one or more individual functions, routines, subroutines, or operations of the method. In an illustrative example, the processing threads implementing the method 700 can be synchronized (e.g., using semaphores, critical sections, and/or other thread synchronization mechanisms). Alternatively, the processing threads implementing the method 700 can be executed asynchronously with respect to each other. Various operations of the method 700 can be performed in a different (e.g., reversed) order compared with the order shown in FIG. 7. Some operations of the method 700 can be performed concurrently with other operations. Some operations can be optional. In some embodiments, the parsing subsystem 112 or the event log analytics subsystem 114 may perform the method 700.

Block 710 includes obtaining a first structured event log 400 of one or more first event logs 400 of first telemetry data. The first structured event log 400 can include a first event log key-value pair 402-1 and a second event log key-value pair 402-2. The first and second event log key-value pairs 402-1, 402-2 may each include a respective event log key 404-1, 404-2 and a corresponding value 406-1, 406-2. Block 710 may include functionality similar to the functionality of block 310 of the method 300 of FIG. 3.

Block 720 may include generating a portion of parser code. In response to the value 406-1 of the first event log key-value pair 402-1 including a predetermined first value, the portion of the parser code may map the event log key 404-2 of the second event log key-value pair 402-2 to a first predetermined field 434-1. In response to the value 406-1 of the first event log key-value pair 402-1 including a predetermined second value, the portion of the parser code may map the event log key 404-2 of the second event log key-value pair 402-2 to a second predetermined field 434-2.

For example, for the event log 400 of FIG. 4A, the first event log key-value pair 402 may be the "http. request_method" key-value pair 402-7, and the second event log key-value pair 402 may be the "url" key-value pair 402-8. In response to the value 406-7 of the first event log key-value pair 402-7 having a value of "GET," then the parser may map the value 406-8 of the "url" key 404-8 to the "target.url" predefined field 434-7. However, in response to the "http.request_method" key 404-7 having a corresponding value 406-7 of "POST," then the parser may map the value 406-8 of the "url" key 404-8 to a different predefined field 434.

In some implementations, the first event log key-value pair 402-2 may include the second event log key-value pair 402-2. In other words, the first event log key-value pair 402-2 and the second event log key-value pair 402-2 may be the same event log key-value pair 402. Thus, the value 406 of the event log key-value pair 402 may be mapped to different predefined fields 434 depending on the value 406.

In some implementations, block 720 may include identifying the first predefined field 434 or the second predefined field 434. Block 720 may include identifying the predetermined first value or the predetermined second value. In one implementation, identifying a predefined field 434 or predetermined value may include obtaining input from a user interface in data communication with the event log analytics system 110, and the user input may specify a predefined field 434, predetermined value, a range for the predetermined value, or other data.

Block 730 may include generating an event log parser that includes the portion of the parser code of block 720. Block 730 may include similar functionality to block 340 of the method 300. Block 740 may include causing the event log parser to be executed on a second structured event log 400 of one or more second event logs 400 of second telemetry data. Block 740 may include similar functionality to block 350 of the method 300. It should be noted that although the method 700 has been discussed regarding structured event logs 400, the same functionality and steps could be applied to semi-structured event logs 500 as well.

In some implementations, the event log analytics system 110 may present, on a user interface, at least a portion of the one or more of predefined fields 434. Identifying the predefined field in block 320 of the method 300, block 630 of the method 600, or block 720 of the method 700 may include obtaining an input indicating the predefined field 434 from the user interface. In one implementation, the user interface may present the at least a portion of the one or more predefined fields 434 using a drop-down box. In another implementation, the user interface may include a text box where a user can input text. The user may input text into the text box, and the event log analytics system 110 may analyze the text input, retrieve at least a portion of the one or more predefined fields 434 based on the input text, and present, on the user interface, the at least a portion of the one or more predefined fields 434. The event log analytics system 110 may retrieve the at least a portion of the one or more predefined fields 434 based on a semantic similarity between the input text and the one or more predefined fields 434 or using some other similarity metric.

FIG. 8 depicts an example user 800 interface for identifying one or more predefined fields 434. The parsing subsystem 112 may display the user interface 800 as part of block 320, 630, or 720. During parser creation operations, the user interface may allow a user to identify which event log keys 404 of an event log 400 should map to which predefined fields 434.

The user interface 800 may include one or more columns 802, 804, or 806. For example, a first column 802 may list the event log keys 404 in the first event log 400 or 500. A second column 804 may list the values 406 for the corresponding event log keys 404 listed in the first column 802. A third column 806 may include one or more user input areas 808 where a user can provide user input to identify the predefined field 434 that an event log key 404 should map to. A user input area 808 can include a text box where a user can input text that identifies the predefined field 434. A user input area 808 can include a drop-down list 810. The drop-down list may include a list of possible predefined fields 434. The parsing subsystem 112 may determine an order of the predefined fields 434 in the drop-down list 810 based on the event log key 404 or the value 406 of the same row as the user input area 808. In some implementations, the parsing subsystem 112 may calculate a relevancy of one or more predefined fields 434 and may sort the items of the drop-down list 810 by relevance. Calculating the relevancy may be based on the data type or format of the value 406 of the event log key 404 (e.g., a timestamp, an integer, a float, an IP address, a text string, a URL, etc.), a name of the event log key 404, the similarity of the event log key 404 to predefined fields 434 in the set 430 of mappings 432 of other parsers or parser extensions, or other relevancy-determining configurations. In response to the user completing the input of the predefined fields 434 in the predefined field column 806 (e.g., as indicated by the user interacting with a "Finish" or "Submit" button of the user interface 800), the user interface may send the identified predefined fields 434 to the parsing subsystem 112 to generate the mappings 432.

In some implementations, the method 300, 600, or 700 may include validating the event log parser. Validating the parser may include testing the performance of the parser on at least a subset of the one or more first event logs 400 or 500 of the first telemetry log data. As discussed above, the first telemetry log data may include one or more event logs 400 or 500. The parsing subsystem 112 may obtain a subset of these event logs 400 or 500 and test the parser on the subset of event logs 400 or 500. Testing the parser may include the parser executing on the subset of event logs 400 or 500.

In one implementation, testing the performance of the parser may include determining whether the parser successfully executes on at least a predetermined percentage of the subset of event logs 400 or 500. The parser successfully executing on an event log 400 or 500 may include the parser executing on the event log 400 or 500 without producing an error or without producing a critical error. The parser successfully executing on an event log 400 or 500 may include the parser correctly mapping the values 406 of the key-value pairs 402 in the event log 400 or 500 to their corresponding predefined field 434 based on the parser's set 430 of mappings 432-1, . . . , 432-7. In response to the parser successfully executing on at least the predetermined percentage of the subset of event logs 400 or 500, the parser may pass the performance test. Otherwise, the parser may fail the performance test.

In some implementations, testing the performance of the event log parser may include calculating a length of time of executing the parser on the subset of event logs 400 or 500 and determining whether the length of time is below a threshold time length. In response to the length of time being above the threshold time length, the parser may fail the performance test. In response to the parser's length of time being below the threshold amount of time, the parser may pass the performance test.

In one or more implementations, testing the performance of the parser may include analyzing other performance metrics of the parser. In response to the parser's performance metric being below a threshold metric, the parser may pass the performance test. Otherwise, the parser may fail the performance test. A performance metric may include an execution time of the parser, a computing resource used by the parser, the number of event logs 400 or 500 dropped by the parser, or other performance metrics.

In one or more implementations, testing the performance of the parser may include determining whether a predefined field 434 of a data object 460 does not include an associated value 464. In other words, testing the parser may include determining whether the converted event log 400 or 500, in its predefined format (e.g., in the form of the data object 460), includes any predefined fields 434 that are empty. An empty predefined field 434 may indicate that the parser is not functioning properly. In response to the parser converting at least a threshold amount of the subset of event logs 400 or 500 without empty predefined fields 434, the parser may pass the performance test. Otherwise, the parser may fail the performance test.

In some implementations, testing the performance of the parser may include determining whether the value 464 of a predefined field 434 is within a predetermined range for that predefined field 434. In some cases, the parser may normalize the value 464. In response to the parser converting at least a threshold number of the subset of event logs 400 or 500 with values 464 within their respective predefined fields' 434 predetermined ranges, the parser may pass the performance test. Otherwise, the parser may fail the performance test. The predetermined range may include a range set by the user creating the parser or may be based on configuration data in the parsing subsystem 112. As an example, a predefined field 434 may be configured to accept a value with a timestamp format. The predefined field 434 may be configured such that the predetermined range for the predefined field 434 includes timestamps prior to the event log analytics system's 110 current time.

In certain implementations, testing the performance of the parser may include determining whether the parser set a predefined field 434 to an incorrect value 464. In response to the parser setting a predefined field 434 to an incorrect value 464 for at least a threshold number of the subset of event logs 400 or 500, the parser may fail the performance test. Otherwise, the parser may pass the performance test.

In some implementations, validating the parser may occur after the parser has been generated. In certain implementations, certain validation functionality may occur while the parser is being created or configured. For example, in response to a set 430 of mappings 432 including a certain predefined field 434, the parsing subsystem 112 may require the set 430 of mappings 432 to include a predetermined required predefined field 434. Validating the parser may include determining whether the set 430 includes the predetermined required predefined field 434. In response to the set 430 not including the predetermined required predefined field 434, the parsing subsystem 112 may not validate the parser and may alert, using a user interface, the user creating or configuring the parser of the absence of the predetermined required predefined field 434. The parsing subsystem 112 may include other validation functionality that occurs while a user is creating or configuring a parser.

In one implementation, the event log parser generated using the method 300, 600, or 700 may include a parser extension. The parsing subsystem 112 may associate the parser extension with a parser. The associated parser may include a parser that is being augmented (which may sometimes be referred to, herein, as the "base parser"). Associating the parser extension with the base parser may include generating a logical link in the parser storage 120 from the base parser to the parser extension or vice versa. In some cases, the parser extension may be associated with an event type (which may include an event type that the base parser may accept as input). Generating and executing the parser extension may be similar to generating and executing a parser, as discussed herein.

In some implementations, the method 300, 600, or 700 may further include performing one or more data analysis operations on a data object 460. The data object 460 may have been generated as part of, or in response to, the parser executing on an event log 400 or 500 as part of block 350, 660, or 740. Performing the one or more data analysis operations may include performing a statistical analysis on the data object 460, performing an inference calculation on the data object 460 using one or more machine learning models (MLMs), inputting the data object 460 into an artificial intelligence (AI) model, or performing some other type of data analysis operation. In some implementations, performing the one or more data analysis operations may include performing the one or more data analysis operations on multiple data objects 460. Performing the one or more data analysis operations may include identifying trends in the one or more data objects 460 regarding use of the computing devices or software of the computing resources 130, identifying a cyberattack on the computing resources 130, or may include other operations. The event log analytics subsystem 114 may perform the data analysis operations. In some implementations, a user of the computing resources 130 may view the results of the data analysis. The end user may use a user interface of the computing resources 130 that is in data communication with the event log analytics subsystem 114 to view the results.

In one or more implementations, performing data analysis operations may include the event log analytics subsystem using one or more MLMs to analyze one or more data objects 460. It should be understood that an MLM can refer to a variety of MLMs. For example, an MLM can include an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. The ANN can undergo training to adjust the weights or adjust other features of the ANN. Such training may include inputting a training set and other information into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like.

In some implementations, the one or more first event logs 400 or 500 may be generated by one or more nodes of a cloud-based system at a first point in time. The one or more nodes of the cloud system may include one or more components 132, 134, 136 of the computing resources 130. The one or more second event logs 400 or 500 may be generated by the one or more of nodes of the cloud-based system at a second point in time. In one implementation, execution of the event log parser at block 350, 660, or 740 may result in the detection of an indication of malicious activity with respect to a node of the cloud-based system. In some implementations, the detection of the malicious activity may include the event log analytics subsystem 114 analyzing the data object 460 generated by the parser executing on one or more of the one or more second event logs 400 or 500 and detecting the malicious activity based on a data analysis of the data objects 460.

In certain implementations, the one or more second event logs 400 or 500 of block 350, 660, or 740 may include one or more test event logs 400 or 500. A test event log 400 or 500 may include an event log 400 or 500 that the event logs analytics system 110 or a user of the system 110 has identified for use in testing parsers or parser extensions. Causing the event log parser to be executed on the second event log 400 or 500 (in block 350, 660, or 740) may include presenting, on a user interface, a preview parsing of the second event log 400 or 500. The preview parsing can include a visualization of mappings 432 from one or more event log keys 404 of the second event log 400 or 500 to the event log keys' 404 corresponding predefined fields 434 based on the portions of the parser code. The preview parsing may include a visualization of the values 406 that were mapped to the predefined fields 434. The visualization may allow a user to view the mappings 432 and the values 464 assigned to the predefined fields 434 to determine whether the parser has been configured correctly.

In some implementations, the parser may include functionality in addition to mapping event log keys 404 to predefined fields 434. For example, in one implementation, causing the event log parser to be executed on the second event log 400 or 500 (in block 350, 660, or 740) may include the parser normalizing the value 406 mapped to a predefined field 434. In certain implementations, the parser may convert a value 406 into a different data format. For example, the raw event log 400 may include a timestamp in the UNIX epoch timestamp format (e.g., 1588059648.129), and the predefined format may include a timestamp in the format [YEAR]-[MONTH]-[DAY]T[HOUR]:[MINUTE]:[SEC-OND]Z (e.g., 2020-04-28T07:40:48.129Z) where T indicates that the data following the "T" is the clock time and Z indicates that the timestamp is offset from Coordinated Universal Time (UTC) by 0. In another example, the parser may convert a float to an integer. In certain implementations, the parser may automatically include certain data in the predefined format. For example, the parser may include one or more predefined fields 434 indicating the event type of the event log 400, the device that generated the event log 400 (e.g., the device's product name, the device's model identifier, the device's manufacturer or vendor, etc.), the software that generated the event log 400 (e.g., the software's name, the software's version, the software's developer or vendor, etc.), or other predefined fields.

In some implementations, the first event log 400 or 500 may include an event type. The event type may indicate information about the nature of the event represented by the event log 400 or 500. The event type may be indicated in the event log 400 or 500 itself or may be indicated by metadata associated with the event log 400 or 500. For example, in FIG. 4C, the event type may be indicated by the predefined field-value pair 462-8, where the predefined field 434-8 is "metadata.event_type" and the corresponding value 464-8 is "NETWORK HTTP." This may indicate that the event type of the event log 400 of FIG. 4A relates to Hypertext Transfer Protocol (HTTP) networking. As can also be seen from FIG. 4A, the event log 400 did not include a key 404 that indicated the event type. Thus, the parsing subsystem 112 may have determined the event type from metadata associated with the event log 400. The method 300, 600, or 700 may further include associating the event log parser with the event type. Associating the event log parser with the event type may include generating a logical link on the event log analytics system 110 between the parser and the event type. In one implementation, causing the event log parser to be executed on the second event log 400 or 500 (in block 350, 660, or 740) may include causing the event log parser to be executed in response to the second event log 400 or 500 belonging to the event type associated with the event log parser. The parsing subsystem 112, prior to or as part of causing the event log parser to be executed, may determine the event type. Determining the event type may be based on metadata associated with the second event log 400 or 500 or may include analyzing an event log key-value pair 402 of the second event log 400 or 500.

While FIG. 4A and FIG. 5 depict event logs 400 or 500 with nine keys 404, an event log 400 or 500 may have any number of keys 404. Similarly, while the set 430 of mappings 432 in FIG. 4B includes seven mappings 432, a set 430 of mappings 432 may include any number of mappings 432. While the data object 460 of FIG. 4C includes ten predefined fields 434, a data object 460 may include any number of predefined fields 434.

FIG. 9 is a block diagram illustrating an example computer system 900, in accordance with implementations of the present disclosure. The computer system can be a computing device or other device discussed herein. The computer system 900 can be the event log analytics system 110, the parsing subsystem 112, the event log analytics subsystem 114, the parser storage 120, the event log storage 122, a server 132, a network device 134, or a data storage device 136 of FIG. 1. The computer system 900 can be a cloud management system 212 of FIG. 2B. The computer system 900 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a volatile memory 904 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 906 (e.g., flash memory, static random access memory (SRAM), etc.), and a data storage device 916, which communicate with each other via a bus 930.

The processing device 902 represents one or more general-purpose processing devices such as a microprocessor, CPU, GPU, or the like. More particularly, the processing device 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 can also be one or more special-purpose processing devices such as an ASIC, a field programmable gate array (FPGA), a digital signal processor (DSP), network processor, or the like. The processing device 902 is configured to execute instructions 926 (e.g., for performing one or more of the methods 300, 600, or 700) for performing the operations discussed herein.

The computer system 900 can further include a network interface device 908. The network interface device 908 can assist in data communication between computing devices. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 918 (e.g., a speaker).

The data storage device 916 can include a non-transitory machine-readable storage medium 924 (also computer-readable storage medium) on which is stored one or more sets of instructions 926 (e.g., for low-code parser creation and other functionality disclosed herein) embodying any one or more of the methodologies or functions described herein. The instructions 926 can also reside, completely or at least partially, within the volatile memory 904 and/or within the processing device 902 during execution thereof by the computer system 900, the volatile memory 904 and the processing device 902 also constituting machine-readable storage media. The instructions 926 can further be transmitted or received over a network 920 via the network interface device 908.

In one implementation, the instructions 926 include instructions for low-code parser creation or execution. While the computer-readable storage medium 924 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 300, 600, 700 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
   a memory; and
   at least one processing device, coupled to the memory, configured to perform operations, comprising:
   obtaining a first structured event log of a first plurality of event logs of first telemetry log data, wherein the first structured event log comprises a plurality of event log key-value pairs;

identifying, among a plurality of predefined fields, a predefined field for an event log key of a first event log key-value pair of the plurality of event log key-value pairs;

generating a portion of parser code to map the event log key of the first event log key-value pair to the identified predefined field;

generating an event log parser, wherein the event log parser comprises the portion of the parser code; and causing the event log parser to be executed on a second structured event log of a second plurality of event logs of second telemetry log data.

2. The system of claim 1, wherein:
the first plurality of event logs are generated by a plurality of nodes of a cloud-based system at a first point in time, and the second plurality of event logs are generated by the plurality of nodes of the cloud-based system at a second point in time; and execution of the event log parser results in detection of an indication of malicious activity with respect to a node of the plurality of nodes of the cloud-based system.

3. The system of claim 1, wherein:
the operations further comprise presenting, on a user interface, at least a portion of the plurality of predefined fields; and identifying the predefined field comprises obtaining an input indicating the predefined field from the user interface.

4. The system of claim 1, wherein the parser code comprises computer-executable instructions.

5. The system of claim 1, wherein:
the parser code comprises source code configured to be compiled into computer-executable instructions; and the operations further comprise presenting, on a user interface, the source code.

6. The system of claim 1, wherein the first structured event log comprises at least one of JavaScript Object Notation (JSON) data, Extensible Markup Language (XML) data, or comma-separated values (CSV) data.

7. The system of claim 1, wherein the operations further comprise validating the event log parser, comprising testing a performance of the event log parser on at least a subset of the first plurality of event logs.

8. The system of claim 7, wherein testing the performance of the event log parser comprises determining whether the event log parser successfully executes on at least a predetermined percentage of the subset of the first plurality of event logs.

9. The system of claim 1, wherein the event log parser comprises an event log parser extension associated with a second event log parser.

10. The system of claim 1, wherein causing the event log parser to be executed on the second structured event log comprises causing the portion of the parser code to be executed on a plurality of event log key-value pairs of the second structured event log.

11. A method, comprising:
obtaining a first semi-structured event log of a first plurality of event logs of first telemetry log data, wherein the first semi-structured event log comprises an unstructured portion and a structured portion, and wherein the structured portion comprises a plurality of event log key-value pairs;

obtaining pattern-matching data, the pattern-matching data enabling extraction of the structured portion from the first semi-structured event log;

identifying, among a plurality of predefined fields, a predefined field for an event log key of an event log key-value pair of the plurality of event log key-value pairs;

generating a portion of parser code, wherein the parser code comprises computer-executable instructions that map the event log key of the event log key-value pair to the identified predefined field;

generating an event log parser, wherein the event log parser comprises the pattern-matching data and the portion of parser code; and causing the event log parser to be executed on a second semi-structured event log of a second plurality of event logs of second telemetry log data.

12. The method of claim 11, wherein the unstructured portion of the first semi-structured event log comprises a syslog header.

13. The method of claim 11, wherein:

the second plurality of event logs comprises a plurality of test event logs; and causing the event log parser to be executed on the second semi-structured event log comprises presenting, on a user interface, a preview parsing of the second semi-structured event log, wherein the preview parsing comprises a visualization of mappings from a plurality of event log keys of the second semi-structured event log to their corresponding predefined fields based on the portions of the parser code.

14. The method of claim 11, wherein causing the event log parser to be executed on the second semi-structured event log comprises converting a value of an event log key-value pair of the second semi-structured event log to a different format.

15. The method of claim 11, wherein causing the event log parser to be executed on the second semi-structured event log comprises normalizing a value of an event log key-value pair of the second semi-structured event log.

16. The method of claim 15, further comprising validating the event log parser, comprising determining whether the normalized value is within a predetermined range.

17. A method, comprising:

obtaining a first structured event log of a first plurality of event logs of first telemetry data, wherein the first structured event log comprises a first event log key-value pair and a second event log key-value pair, and wherein the first and second event log key-value pairs each comprise a respective event log key and a corresponding value;

generating a portion of parser code, wherein:

in response to the value of the first event log key-value pair including a predetermined first value, the portion of parser code maps the event log key of the second event log key-value pair to a first predefined field, and in response to the value of the first event log key-value pair including a predetermined second value, the portion of parser code maps the event log key of the second event log key-value pair to a second predetermined field;

generating an event log parser, wherein the event log parser comprises the portion of the parser code; and causing the event log parser to be executed on a second structured event log of a second plurality of event logs of second telemetry data.

18. The method of claim 17, wherein the first event log key-value pair comprises the second event log key-value pair.

19. The method of claim 17, wherein:

the first structured event log includes an event type; and the method further includes associating the event log parser with the event type.

20. The method of claim 19, wherein causing the event log parser to be executed on the second structured event log comprises causing the event log parser to be executed in response to the second structured event log belonging to the event type.

* * * * *